Jan. 20, 1959   E. H. SAHAGIAN   2,869,892
HYDRAULIC STABILIZING SYSTEM FOR VEHICLES
Filed May 23, 1957   8 Sheets-Sheet 2

Fig. 2.

INVENTOR.
Edward H. Sahagian

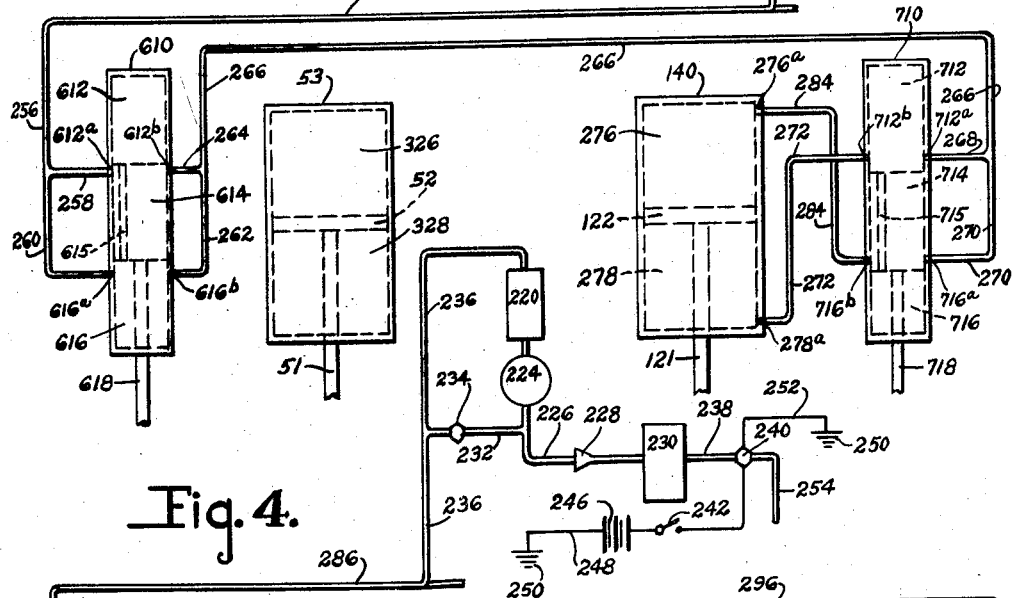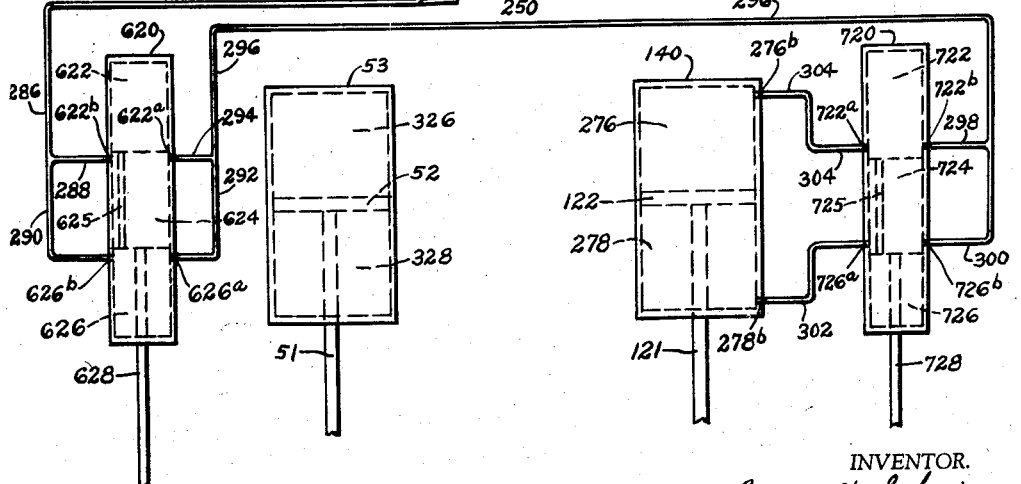

INVENTOR.
Edward H. Sahagian

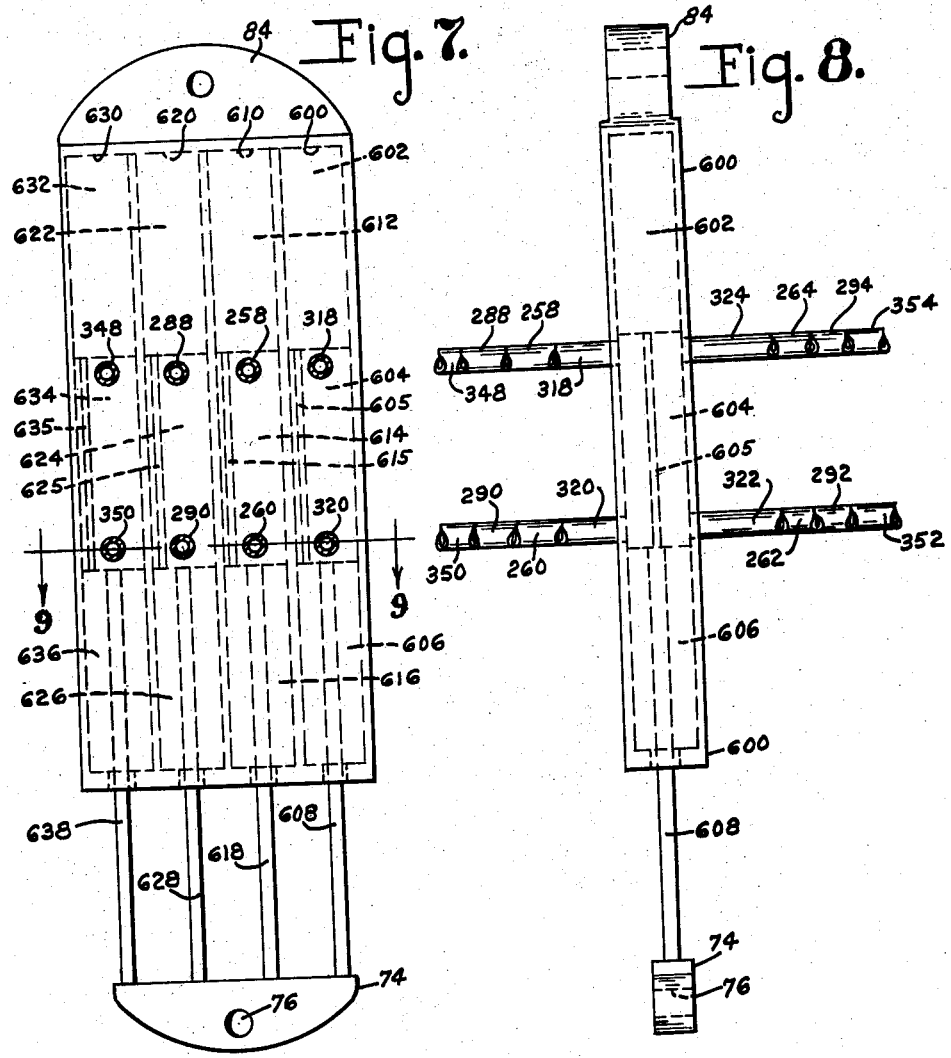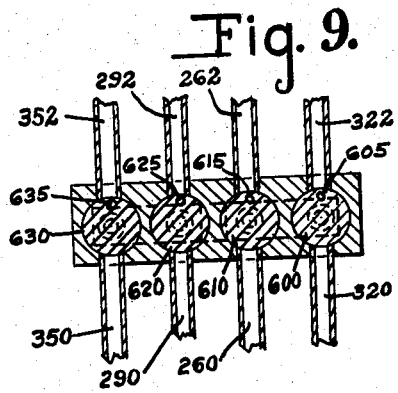

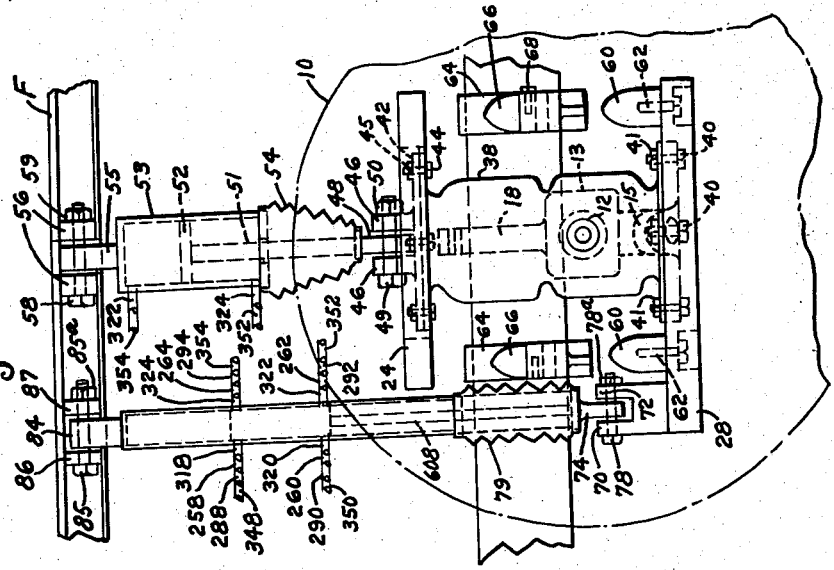

Jan. 20, 1959     E. H. SAHAGIAN     2,869,892
HYDRAULIC STABILIZING SYSTEM FOR VEHICLES

Filed May 23, 1957                                    8 Sheets-Sheet 7

INVENTOR.
Edward H. Sahagian

INVENTOR.
Edward H. Sahagian

United States Patent Office 2,869,892
Patented Jan. 20, 1959

2,869,892
HYDRAULIC STABILIZING SYSTEM FOR VEHICLES

Edward H. Sahagian, Boston, Mass.

Application May 23, 1957, Serial No. 661,237

6 Claims. (Cl. 280—124)

This invention relates to a hydraulic stabilizing system for vehicles, and preferably is operatively connected with sealed, air bellows which suspend the vehicle.

One object of my invention is to stabilize the vehicle so as to automatically provide a level ride under all conditions of travel, and to have the vehicle maintain a uniform height regardless of changes in load.

Another object is to prevent a front part of a vehicle from "nosediving" when making a quick stop or a sudden decrease in speed, and to prevent a rear part of a vehicle from "squatting" when starting rapidly from a standing position.

Still another object is to keep a vehicle frame level (avoiding any leaning), when making a change of direction.

A further object is to have the control valve assembly at each wheel, when actuated, to act as automatic, hydraulic control units for the hydraulic system.

A still further object is to keep a vehicle riding level when traveling on a rough road through action of the hydraulic, stabilizing system in automatically correcting any tendency of the body to move up and down, or to roll and pitch.

The foregoing and other objects which will appear as the nature of the invention is better understood, may be accomplished by a construction, combination and operative arrangement of parts such as is disclosed by the drawings. The nature of the invention is such as to render it susceptible to various changes and modifications, and therefore, I am not to be limited to the construction disclosed by the drawings, nor to the particular parts described in the specification; but am entitled to all such changes therefrom as fall within the scope of my claims.

In the drawings:

Fig. 2 is a side elevational view showing the left side of my hydraulic, stabilizing system extending from a front to a rear wheel, the cylinders and pistons being shown in section.

Fig. 3 is a diagrammatic view of that part of my pressure system which actuates the operation of the rear left, stabilizing cylinder.

Fig. 4 is a diagrammatic view of that part of my return system which functions together with the pressure system shown in said Fig. 3.

Fig. 7 is a front elevational view of the left front control valve assembly.

Fig. 8 is a side elevational view of the control valve assembly shown in Fig. 7.

Fig. 9 is a sectional view taken on the line 9—9 of Fig. 7.

Fig. 10 is a front elevational, fragmentary view, showing a vehicle, left front wheel connected to a control valve assembly and stabilizing piston and cylinder.

Fig. 11 is a fragmentary, side elevational view of the mechanism shown in Fig. 10.

Figure 1:
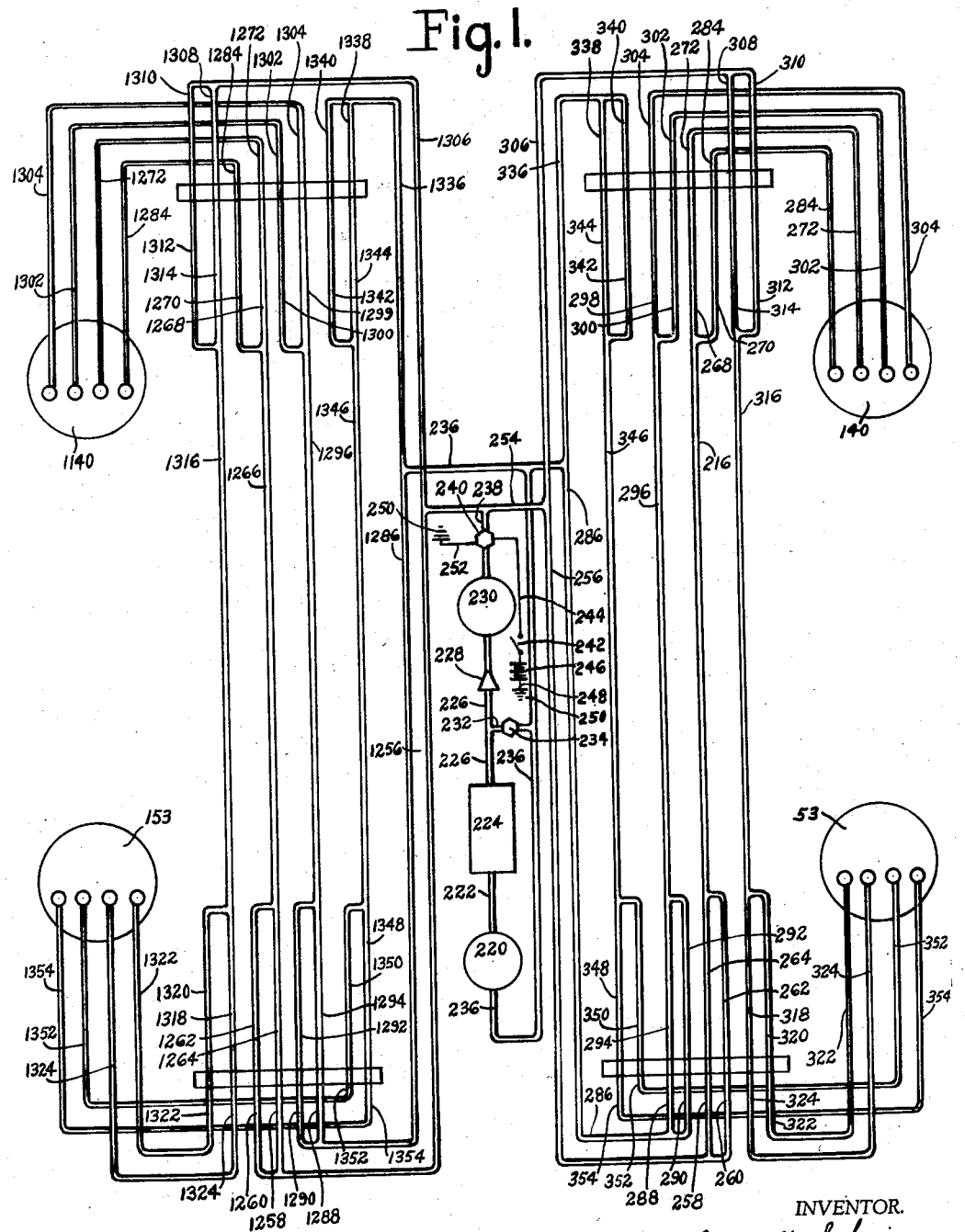
Fig. 1 is a diagrammatic view of my complete hydraulic stabilizing system for the four wheels of a vehicle.
Figure 5:
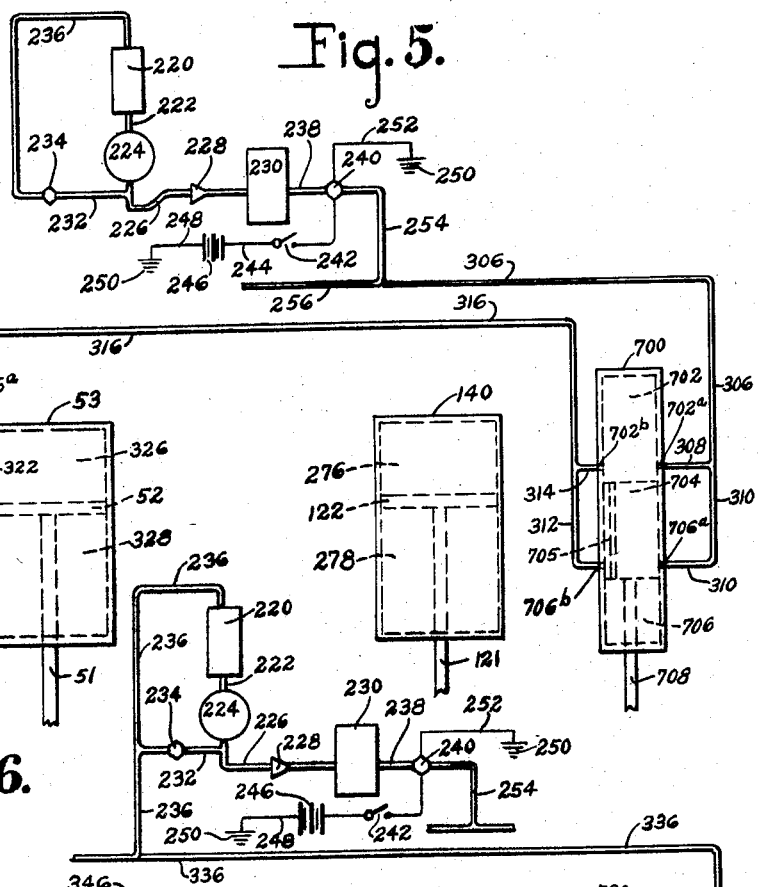
Fig. 5 is a diagrammatic view of that part of my pressure system which actuates the operation of the front left, stabilizing cylinder.
Figure 6:
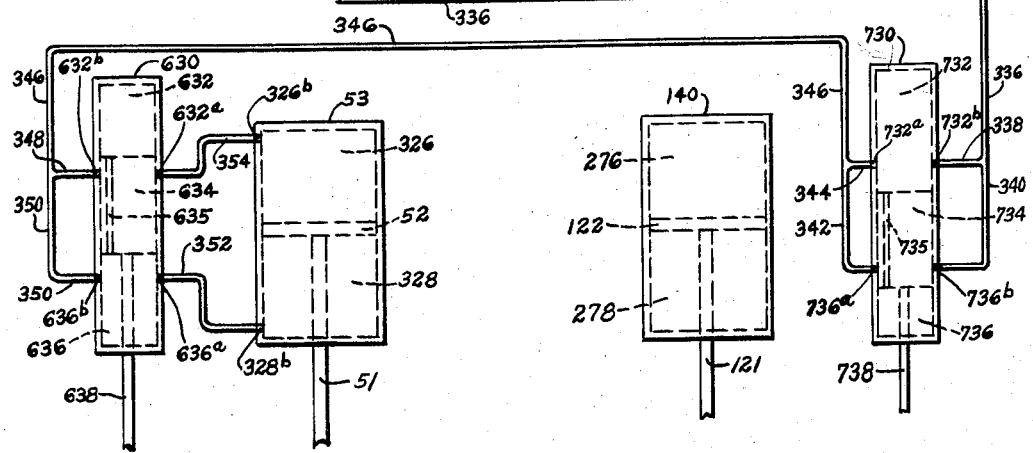
Fig. 6 is a diagrammatic view of that part of my return system which functions together with the pressure system shown in said Fig. 5.
Figure 12:
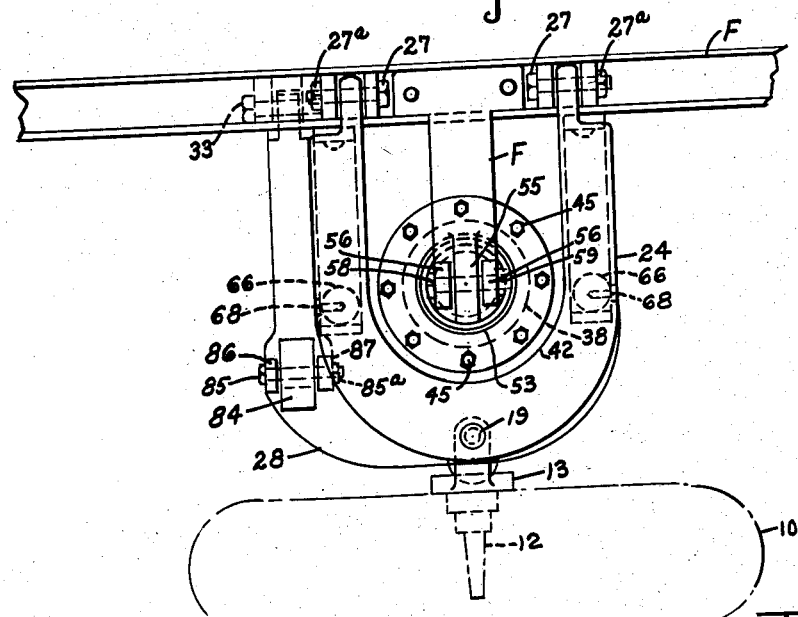
Fig. 12 is a top plan view of the mechanism shown in Fig. 10, the left front wheel being shown in broken lines.
Figure 14:
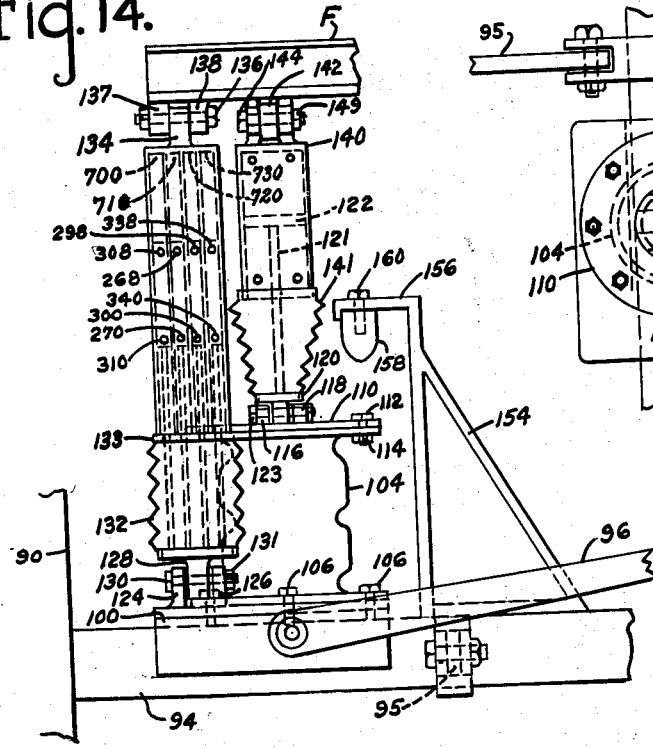
Fig. 14 is a rear elevational, fragmentary view of the mechanism shown in Fig. 13.
Figure 15:
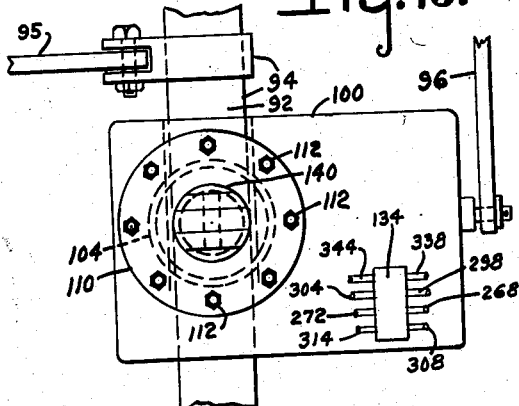
Fig. 15 is a top plan view of the mechanism shown in Fig. 13.
Figure 13:
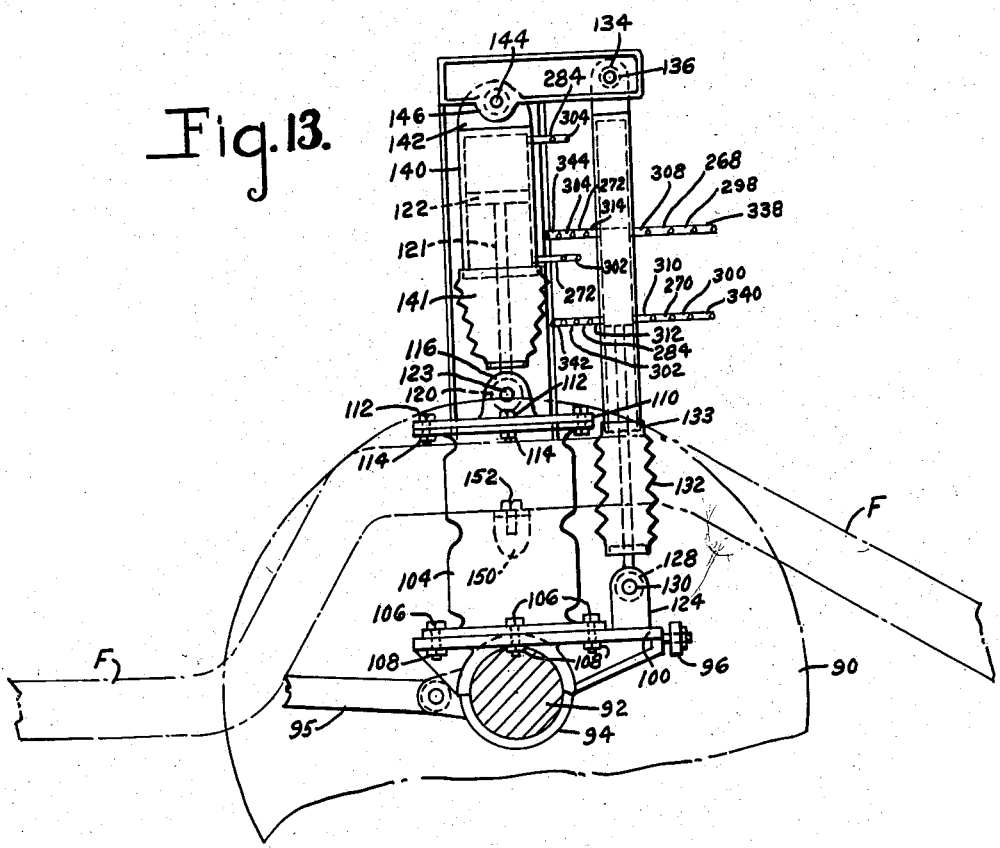
Fig. 13 is a fragmentary, side elevational view showing a vehicle, rear left wheel connected to a control valve assembly and stabilizing cylinder and piston.
Figure 16:
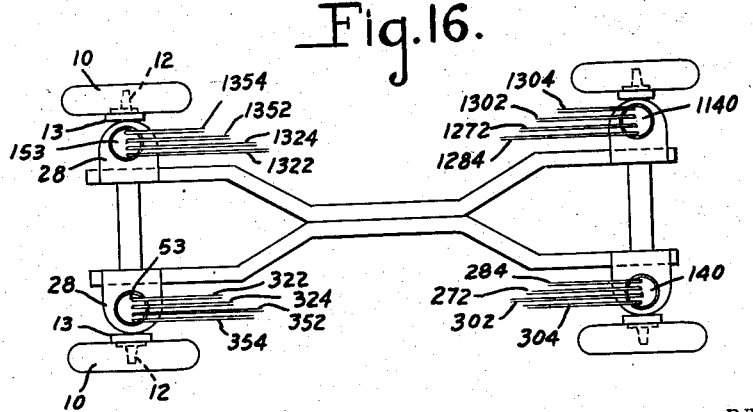
Fig. 16 is a diagrammatic view of a vehicle with four wheels, showing the connections to my hydraulic system.

As illustrated, my vehicle has two front wheels 10 at opposite sides rotating on the usual spindle shafts 12. A spindle support 13 at each wheel extends to, and is integral with, said spindle shaft 12, and it has a lower part 14 which is pivotally attached to a lower ball joint 15 by a bolt 16 and a nut 17. The upper part 18 of said spindle support 13 is attached to an upper joint 19 by a bolt 20 and a nut 21. A crescent-shaped, upper control member 24 is attached to the upper ball joint 19 and is pivotally attached at two opposite ends at its other end, to a main frame F of the vehicle by means of bolts 27 and nuts 27a. A crescent-shaped lower control member 28 is attached to the lower ball joint 15 by a bolt 29 and a nut 30, and is pivotally attached at two opposite ends to the frame lugs 32 by means of headed bolts 33. Said upper control member 24 and lower control member 28 move together.

A bellows 38 is seated on the lower control member 28 and is held in place by bolts 40 and nuts 41. A plate 42, which is separate from upper control member 24 is attached to the top of bellows 38 by bolts 44 and nuts 45. Plate 42 has two brackets 46 welded on it and spaced apart, with lateral holes through them. 48 is a piston rod anchor with a lateral hole through it. A bolt 49 goes through the lateral hole in the brackets 46 and the lateral hole in the piston rod anchor 48. A nut 50 holds bolt 49 in place. Thus the piston rod anchor 48 is pivotally attached to and can move with the bellows 38 if the latter moves substantially.

A piston rod 51 with a piston rod head 52, is movable within a left front stabilizing or main cylinder 53 and is attached to said piston rod anchor 48 outside said cylinder 53. A rubberized bellows-like dust shield 54 is attached to said piston rod anchor 48 at one end and the other end is attached to the bottom end of said stabilizing cylinder 53 and it moves with said piston rod 51. The upper end of said stabilizing cylinder 53 has an anchor member 55 extending between two brackets 56 welded to said frame F. A bolt 58 extends through holes in brackets 56 and a hole in said anchor member 55, being held in place by a nut 59 thus pivotally holding said stabilizing cylinder 53 to said frame F.

Two lower snubbers 60 are bolted to lower control member 28 by bolts 62 on opposite sides of the bellows 38. Two angle iron supports 64 project out from frame F on opposite sides of the bellows 38. A rubber snubber 66 is attached to each angle iron support 64 by a bolt 68. Said lower control member 28 has two brackets 70 and 72 welded on it, which are spaced apart with lateral holes through them. 74 is a piston rod anchor with a lateral hole 76 through it. A bolt 78 goes through the lateral holes in the brackets 70 and 72 and the lateral hole 76 in the piston rod anchor 74. A nut 78a holds bolt 78 in place. Thus the piston rod anchor 74 is pivotally attached to and moves with the lower control member 28.

Fixed to said piston rod anchor 74 are piston rods 608, 618, 628 and 638 of a piston rod and cylinder control assembly, later described. Attached to and above said piston rod anchor 74 is a rubberized, bellows-like dust shield 79 which extends and is attached to the lower sides of cylinders 600, 610, 620 and 630 later described, which are part of said assembly.

A cylinder anchor member 84 has said four cylinders 600, 610, 620 and 630 attached thereto, and a bolt 85 with a nut 85A pivotally extending laterally through a hole in said anchor member 84 and through holes in two bracket members 86 and 87 spaced apart, and which are welded to said frame F.

My vehicle has two rear wheels 90 at opposite sides rotating on the usual axles 92 in an axle housing 94. There are two rear axle support arms 95 which are pivotally attached to and extend between the rear axle housing 94 and the car frame F, which permit upward or downward movement of the axle housing 94 with relation to the car frame. These arms 95 also prevent relative forward or backward movement between the car frame and said axle housing 94. A track bar 96 is pivotally attached to a bellows mounting plate 100 at one end, and to the car frame F at its other end, which prevents sidewise movement of the rear axle housing 94 relative to the car frame F.

Said bellows mounting plate 100 is welded on said axle housing 94. A bellows 104 is seated on the bellows mounting plate 100 and is held in place by bolts 106 and nuts 108. A supporting plate 110 is attached to the top of the bellows 104 by bolts 112 and nuts 114. Plate 110 has two brackets 116 and 118 welded on it and spaced apart with lateral holes through the brackets. 120 is a piston rod anchor with a lateral hole through it. A piston rod 121, for a stabilizing cylinder 140, later described, is integral with said piston rod anchor 120 having a head 122. A bolt 123 goes through the lateral holes in the brackets 116 and 118 and the lateral hole in the piston rod anchor 120. Thus the piston rod anchor 120 is pivotally attached to and can move with the bellows 104 if the latter moves substantially. Said bellows mounting plate 100 has two brackets 124 and 126 welded to it behind and a little to one side of the place where bellows 104 is attached to the bellows mounting plate 100. The brackets 124 and 126 are spaced apart with a lateral hole running through them. 128 is a left rear piston rod anchor with a lateral hole running through it. A bolt 130 goes through the lateral holes in the brackets 124 and 126 and the lateral hole in the left rear piston rod anchor 128 and is held in place by a nut 131. Thus the piston rod anchor 128 is pivotally attached to and moves with the mounting plate 100.

Fixed to said left rear piston rod anchor 128 are piston rods 708, 718, 728 and 738 later described. Attached to and above said rear left piston rod anchor 128 is a rubberized bellows-like, dust shield 132, which extends to an anchor 133, to which it is cemented. This shield 132 encloses the bottom sides of cylinders 700, 710, 720 and 730, later described. An anchor member 134 has said rear left four cylinders 700, 710, 720 and 730 attached thereto, and a bolt 136 pivotally extends laterally through a hole in said anchor member 134 and through holes in two brackets 137 and 138 that are spaced apart and which are welded to said frame F.

At one side and to the front of said rear control valve assembly is a left rear stabilizing or main cylinder 140 to the lower end of which the upper end of a bellows-like dust shield 141 is attached, and the bottom end of said bellows-like dust shield 141 is attached to the piston rod anchor 120. At the top of said stabilizing cylinder 140 is an anchor 142 having a lateral hole through which a bolt 144 pivotally extends and also through holes in a bracket 146 welded to said frame F. A nut 149 is attached to bolt 144. Attached to the bottom of frame F at a point just above the rear axle housing 94 is a rubber snubber 150 held to the frame by a nut 152. Welded to said rear axle housing 94 is a triangular bracket 154 having a projecting member 156 to which is attached a rubber snubber 158 by a nut 160. Said snubber 158 is above said mounting plate 110, hence its downward travel will be stopped when it encounters said mounting plate 110. The sudden dropping of a said rear wheel 90 will cause such a downward travel.

My hydraulic system responds to movement of said control valves. Said hydraulic system includes a reservoir 220 for the oil or other hydraulic fluid from which reservoir fluid flows into a conduit 222 that extends to a pump 224. Then a conduit 226 therefrom, having a check valve 228, extends to an accumulator 230. Another conduit 232 extends from conduits 226 and it has a relief valve 234 therein, and this conduit 232 extends to a return conduit 236. Only when undue pressure is built up in said pump 224 does said relief valve 234 open, thus permitting circulation of fluid to reservoir 220. From said accumulator 230, a conduit 238 has an electric shut-off valve 240 which extends to a switch 242 connected by a wire 244, to a usual battery 246 for said vehicle, and therefrom a wire 248 extends to the vehicle frame or other suitable ground 250. Another wire 252 extends from said shut-off valve 240 to said frame or other ground. From said conduit 238 beyond said valve 240, a conduit 254 communicates with a conduit 256 and the latter extends to a conduit 258 that communicates with an inlet 612a and an outlet 612b of an upper chamber 612 of a control valve cylinder 610. From said conduit 256, a conduit 260 extends to an inlet 616a and an outlet 616b of a lower chamber 616 of said control valve cylinder 610.

Within said control valve cylinder 610 is a movable piston head 614 having a longitudinal hole 615 therein to permit flow of fluid between said upper and lower chambers 612 and 616 within said cylinder 610. A piston rod 618 is attached to said piston head 614. When the vehicle is in a normal level position the length of the piston head is such that it extends and just barely covers the inlets 612a and 616a and outlets 612b and 616b respectively of the upper and lower chambers 612 and 616. Any movement of said piston head 614 or of cylinder 610 will uncover one pair of said inlets and outlets of one said chamber thus permitting fluid to flow into either an upper or lower said chamber whenever any movement of either the cylinder or piston takes place. When the vehicle body is low in the front the piston head 614 covers the inlet 612a of the upper chamber 612 thus preventing any hydraulic flow into the upper chamber 612 from conduit 258. Hydraulic flow can take place from conduit 260 into the lower chamber 616 of said control valve cylinder 610 because the piston head 614 has moved up into upper chamber 612 and leaving the inlet 616a and outlet 616b of lower chamber 616 of control valve cylinder 610 open.

From lower chamber 616 said outlet 616b communicates with a conduit 262 which communicates with a conduit 264 which in turn communicates with said outlet 612b from the upper chamber 612 of control valve cylinder 610. Conduit 262, which communicates with conduit 264, also extends to a conduit 266. Conduit 266 extends to a conduit 268 that communicates with an inlet 712a of an upper chamber 712 of a control valve cylinder 710. Upper chamber 712 also has an outlet 712b. From said conduit 266 conduit 270 extends to inlet 716a of a lower chamber 716 of said control valve cylinder 710. Lower chamber 716 has an outlet of 716b. Within said control valve cylinder 710 is a movable piston head 714 having a longitudinal hole 715 therein to permit the flow of fluid between said upper and lower chambers 712 and 716 within said cylinder 710. A piston rod 718 is attached to said piston head 714.

When the vehicle is in a normal level position, the length of the piston head is such that it extends and just barely covers a pair of said inlets and outlets of either the upper and lower chambers 712 and 716. Any movement of said piston head 714 or cylinder 710 will uncover one pair of said inlet and outlets 712a and 712b or 716a and 716b thus permitting fluid to flow into either an upper chamber 712 or a lower said chamber 716 whenever any movement of either the cylinder or piston takes place. When the vehicle body is high in the rear, the piston head 714 covers the inlet 716a of the lower chamber 716 thus preventing any hydraulic flow into the lower chamber 716 from conduit 270. Hydraulic flow can take place from conduit 268 into upper chamber 712 of control valve cylinder 710 because the piston head 714 has moved down into the lower chamber 716 and leaving the inlet 712a in the upper chamber 712 of control valve cylinder 710 open. From upper chamber 712 said outlet 712b communicates with conduit 272 which communicates with an inlet 278a of lower chamber 278 of a rear left, main or stabilizing cylinder 140.

The hydraulic fluid will flow into the lower chamber 278 forcing the piston head 122 up into the upper chamber 276 of the left rear main cylinder 140. This will continue until the rear of the vehicle is lowered to a level position whereupon the hydraulic flow will stop automatically. The hydraulic flow takes place only when both control valve cylinders 610 and 710 or both said piston heads 614 and 714 are out of a neutral position at the same time. Hydraulic flow to the rear left stabilizing cylinder cannot take place when one control valve cylinder or piston is in a neutral or closed position. From the lower chamber 716 of control valve cylinder 710, said outlet 716b communicates with a conduit 284 which in turn communicates with an inlet 276a to the upper chamber 276 of the rear left stabilizing chamber 140.

Said return conduit 236 communicates with return conduit 286 which in turn communicates with a return conduit 288 that communicates with an outlet 622b and an inlet 622a of an upper chamber 622 of a control valve cylinder 620. Within said control valve cylinder 620 is a movable piston head 624 having a longitudinal hole 625 therein to permit flow of fluid between said upper and lower chambers 622 and 626 within said cylinder 620. A piston rod 628 is attached to said piston head 624. When the vehicle is in a normal, level position, the length of the piston head is such that it extends and just barely covers the inlets 622a and 626a and outlets 622b and 626b respectively of the upper and lower chambers 622 and 626. Any movement of said piston head 624 or cylinder 620 will uncover one pair of said inlet and outlets of one said chamber thus permitting fluid to flow into either an upper or lower said chamber whenever any movement of either the cylinder or piston takes place. (The fluid going through the longitudinal hole 625 in the piston head 624 serves as a shock absorber. The size of the hole determines the stiffness of the shock absorber.)

When the vehicle body is low in the front, the piston head 624 covers the outlet 622b of the upper chamber 622 thus preventing any hydraulic flow out of upper chamber 622 into return conduit 288. Hydraulic flow can take place from lower chamber 626 of said control valve cylinder 620 into return conduit 290 because the piston head 624 has moved up into chamber 622 thus leaving the inlet 626a and outlet 626b of lower chamber 626 of control valve cylinder 620 open. From lower chamber 626 said inlet 626a communicates to a return chamber 292 which communicates with a return conduit 294 which in turn communicates with an inlet 622a. From lower chamber 626 of control valve cylinder 620, return conduit 292 communicates with return conduit 294 and it also communicates with return conduit 296 which latter communicates with a return conduit 298 that communicates with an outlet 722b of an upper chamber 722 of a control valve cylinder 720. Upper chamber 722 also has an inlet 722a. From said return conduit 296 a return conduit 300 extends to an inlet 726b of a lower chamber 726 of said control valve cylinder 720. Lower chamber 726 also has an inlet 726a.

Within said control valve cylinder 720 is a movable piston head 724 having a longitudinal hole 725 therein to permit the flow of fluid between said upper and lower chambers 722 and 726 respectively within said cylinder 720. A piston rod 728 is attached to said piston head 724. When the vehicle is in a normal level position the length of the piston head is such that it extends and just barely covers a pair of said inlets and outlets of either the upper and lower chambers 722 and 726. Any movement of said piston head 724 or cylinder 720 will uncover one pair of said inlets and outlets 722a and 722b respectively, or 726a and 726b, thus permitting fluid to flow into either an upper chamber 722 or a lower said chamber 726.

When the vehicle body is high in the rear, the piston head 724 covers the outlet 726b of the lower chamber 726 thus preventing any hydraulic flow out of the lower chamber 726 into a return conduit 300. Hydraulic flow can take place from the upper chamber 722 of said control valve cylinder 720, into return conduit 298 because the piston head 724 has moved down in the lower chamber 726, leaving open the inlet 722a and outlet 722b in the upper chamber 722 of control valve cylinder 720. From the upper chamber 722 said inlet 722a communicates with a return conduit 304 which communicates with an outlet 276b of an upper chamber 276 of the rear left main cylinder 140. The hydraulic fluid will flow out of the upper chamber 276 in order to give room for the piston head 122 to move up into said upper chamber 276 of the stabilizing cylinder 140. The hydraulic fluid flows into the lower chamber 278 of the left rear stabilizing cylinder 140 from the conduit 272. This flow will continue until the rear of the vehicle is lowered to a level position then the hydraulic flow will stop automatically.

From the lower chamber 278 of the left rear main cylinder 140, is an outlet 278b to return conduit 302 which extends to an inlet in the lower chamber 726 of the control valve cylinder 720.

From said conduit 238 beyond said valve 240, a conduit 254 communicates with a conduit 306 and the latter extends to a conduit 308 that communicates with an inlet 702a and an outlet 702b of an upper chamber 702 of a control valve cylinder 700. From said conduit 306, a conduit 310 extends to an inlet 706a and an outlet 706b of a lower chamber 706 of said control valve cylinder 700. Within said control valve cylinder 700 is a movable piston head 704 having a longitudinal hole 705 therein to permit flow of fluid between said upper and lower chambers 702 and 706 within said cylinder 700. (The fluid being forced through the longitudinal hole 705 in the piston head 704 serves as a shock absorber, the size of which hole determines the resilience of the shock absorber.) A piston rod 708 is attached to said piston head 704. When the vehicle is in a normal, level position the length of the piston head 704 is such that it extends and just barely covers the inlets 702a and 706a and outlets 702b and 706b respectively of the upper and lower chambers 702 and 706. Any movement of said piston head 704, or cylinder 700, will uncover a said inlet and outlet of one said chamber thus permitting fluid to flow into either an upper or lower said chamber whenever any movement of either the cylinder or piston takes place.

When the vehicle body is high in the rear, the piston head 704 covers the inlet 706a of the lower chamber 706 thus preventing any hydraulic flow into the lower chamber 706 from conduit 310. Hydraulic flow can take place from conduit 308 into the upper chamber 702 of said control valve cylinder 700 because the piston head 704 has moved into lower chamber 706, thus leaving the inlet 702a and outlet 702b of upper chamber 702 of control valve cylinder 700 open. From lower chamber 706 said outlet 706b communicates to a conduit 312 which communicates with a conduit 314 which in turn communicates with an outlet 702b from the upper chamber 702 of control valve cylinder 700. Conduit 312 which communicates with conduit 314 also extends to conduit 316. Conduit 316 extends to a conduit 318 that communicates with an inlet 602a of an upper chamber 602 of a control valve cylinder 600. Upper chamber 602 also has an outlet 602b.

From said conduit 316 a conduit 320 extends to an inlet 606a of a lower chamber 606 of said control valve cylinder 600. Lower chamber 606 also has an outlet 606b. Within said control valve cylinder 600 is a movable piston head 604 having a longitudinal hole 605 therein to permit the flow of fluid between said upper and lower chambers 602 and 606 within said cylinder 600. A piston rod 608 is attached to said piston head 604. When the vehicle is in a normal level position, the length of the piston head is such that it extends and just barely covers a pair of said inlet and outlets of either the upper and lower chambers 602 and 606. Any movement of said piston head 604 or cylinder 600 will uncover one pair of said inlets and outlets 602a and 602b or 606a and 606b thus permitting fluid to flow into either an upper chamber 602 or a lower said chamber 606 whenever any movement of either the cylinder or piston takes place.

When the vehicle body is low in the front, the piston head 604 covers the inlet 602a of the upper chamber 602 thus preventing any hydraulic flow into the upper chamber 602 from conduit 318. Hydraulic flow can take place from conduit 320 into lower chamber 606 of control valve cylinder 600 because the piston head 604 has moved up into the upper chamber 602, leaving the inlet 606a in the lower chamber 606 of control valve 600 open. From the lower chamber 606 said outlet 606b communicates with conduit 322 which communicates with an inlet 326a of an upper chamber 326 of a front left stabilizing cylinder 53. The hydraulic fluid will flow into the upper chamber 326 forcing the piston head 52 down into the lower chamber 328 of the front left stabilizing cylinder 53. This will continue until the front of the vehicle is raised to a level position wherefrom the hydraulic flow will stop automatically.

The hydraulic flow takes place only when both control valve cylinders 600 and 700, or both said piston heads 604 and 704, are out of a neutral position at the same time. Hydraulic flow to the front left, stabilizing cylinder 53 cannot take place when one control valve cylinder or piston head is in a neutral or closed position. From the upper chamber 602 of control valve cylinder 600 said outlet 602b communicates with a conduit 324 which in turn communicates with an inlet 324a to the lower chamber 328 of the front left, stabilizing cylinder 53. A piston rod 51 is attached to said piston head 52 in said front left, stabilizing cylinder 53.

Said return conduit 236 communicates with a return conduit 336 which in turn extends to a return conduit 338 that communicates with an outlet 732b and an inlet 732a of an upper chamber 732 of a control valve cylinder 730. From said return conduit 336 return conduit 340 communicates with an outlet 736b and an inlet 736a of a lower chamber 736 of a control valve cylinder 730. Within said control valve cylinder 730 is a movable piston head 734 having a longitudinal hole 735 therein to permit flow of fluid between said upper and lower chambers 732 and 736 within said cylinder 730. A piston rod 738 is attached to said piston head 734.

When the vehicle is in a normal level position, the length of the piston head is such that it extends and just barely covers the inlets 732a and 736a and outlets 732b and 736b respectively of the upper and lower chambers 732 and 736. Any movement of said piston head 734 or cylinder 730 will uncover a said inlet and outlet of one said chamber, thus permitting fluid to flow into either an upper or lower said chamber whenever any movement of either the cylinder 730 or piston head 734 takes place. (The fluid going through the longitudinal hole 735 in the piston 734 serves as a shock absorber, the size of the hole determining the resiliency of the shock absorber.)

When the vehicle body is high in the rear, the piston 734 covers the outlet 736b of the lower chamber 736 thus preventing any hydraulic flow out of lower chamber 736 into return conduit 340. Hydraulic flow can take place from upper chamber 732 of said control valve cylinder 730 into return conduit 338, because the piston head 734 has moved down into chamber 736, leaving the inlet 732a and outlet 732b of upper chamber 732 of control valve cylinder 730 open. From lower chamber 736 said inlet 736a communicates with a return conduit 342 which communicates with a return conduit 344 which in turn communicates with an inlet 732a from upper chamber 732 of control valve cylinder 730. Return conduit 342 which communicates with return conduit 344 also extends to return conduit 346. Return conduit 346 extends to a return conduit 348 that communicates with an outlet 632b of an upper chamber 632 of a control valve cylinder 630 which chamber also has an inlet 632a.

Within said control valve cylinder 630 is a movable piston head 634 having a longitudinal hole 635 to permit the flow of fluid between said upper and lower chambers 632 and 636 within said chamber 630. A piston rod 638 is attached to said piston head 634. When the vehicle is in a normal level position, the length of the piston head is such that it extends and just barely covers a pair of said inlets and outlets of either the upper and lower chambers 632 and 636. Any movement of said piston head 634 or cylinder 630 will uncover one pair of said inlets and outlets 632a and 632b, or 636a and 636b, thus permitting fluid to flow into either an upper chamber 632 or a lower said chamber 636, whenever any movement of either the cylinder or piston takes place.

When the vehicle body is low in the front, the piston head 634 covers the outlet 632b of the upper chamber 632, thus preventing any hydraulic flow out of the upper chamber 632 into return conduit 348. Hydraulic flow can take place from the lower chamber 636 of said control valve cylinder 630 into return conduit 350 because the piston head 634 has moved into upper chamber 632, leaving the inlet 636a and an outlet 636b of lower chamber 636 of control valve cylinder 630 open. There is an inlet 636a in the lower chamber 636 communicating with a return conduit 352 which communicates with an outlet 328b in a lower chamber 328 of the front left, stabilizing cylinder 53. The hydraulic fluid will flow out of the lower chamber 328 in order to make room for the piston head 52 to go down into the lower chamber 328 of the front left, stabilizing cylinder 53. The hydraulic fluid flows into the upper chamber 326 of the left front, stabilizing cylinder 53 from the conduit 322. This flow will continue until the front of the vehicle is raised to a level position then the hydraulic flow will stop automatically. From the upper chamber 326 of the front left, stabilizing cylinder 53 is an outlet 326b to a return conduit 354 which communicates with an inlet 632a in the upper chamber 632 of the control valve cylinder 630.

As shown in said Fig. 1, the right rear and right front hydraulic stabilizing system is a repetition of the left rear and left front hydraulic stabilizing system respectively. Accordingly I have given the elements at the right rear and right front, the same numerals as those at the left rear and left front; but with the addition of the numeral 1 at the left of each numeral. For instance, the conduit at the right rear, that corresponds with the left rear conduit 310, is given numeral 1310.

Said conduit 254 communicates with conduits 1256 and 1306, and said return conduit 236 communicates with conduits 1286 and 1336.

What I claim is:

1. A vehicle in combination with a vehicular stabilizing system, said vehicle embodying a pair of wheels at the front and a pair of wheels at the rear, a frame supported by said wheels, two lower control members and two lower control means operatively connecting each said lower control member to each said front wheel and to said frame, two upper control members and means operatively connecting each said upper control member to each said front wheel and to said frame, shock absorbing means for each said front wheel, means attaching said shock absorbing means to said lower control member, a hydraulic stabilizing cylinder for each said front wheel, and a piston movable therein, means connecting said piston to a said shock absorbing means and other means connecting said stabilizing cylinder to said frame, an assembly of four control valve hydraulic cylinders and four control valve pistons movable therein for each said front wheel, means connecting said control valve pistons to said lower control member, means connecting each said four control valve cylinders to said frame each said control valve piston embodying a piston head having a longitudinal hole therethrough to permit escape of fluid in said control valve cylinder above and below said piston head, shock absorbing means for each said rear wheel, means connecting each said rear shock absorbing means to each said rear wheel, a hydraulic stabilizing cylinder for each said rear wheel and a piston movable therein, means connecting each said rear wheel, shock absorbing means to each said rear wheel stabilizing cylinder piston, means connecting each said rear wheel stabilizing cylinder to said frame, an assembly of four control valve cylinders and four control valve pistons movable therein for each said rear wheel, means connecting each said latter four control valve pistons to a said rear wheel, means connecting said latter four control valve cylinders to said frame, a hydraulic system of pressure lines and return lines in communication with said four stabilizing cylinders and with said four assemblies of control valve hydraulic cylinders, and pressure generating means supported by said frame in communication with said hydraulic pressure and return lines, said control valve assemblies normally keeping both said lines closed, said stabilizing pistons and cylinders and said control valve pistons and cylinders being movable relative to each other in response to movements of said wheels or frame to thereby change the positions of said stabilizing cylinders and pistons therefor relative to each other and the positions of said control valve cylinders and pistons relative to each other to thereby cause movement thereof from closed to open position or from open to closed position.

2. A vehicle in combination with a vehicular stabilizing system, said vehicle embodying a pair of wheels at the front and a pair of wheels at the rear, a frame supported by said wheels, four assemblies each of four control valve hydraulic cylinders and four control valve pistons movable therein, four means one each of which is connected to a said wheel and to the said pistons of a said assembly which pistons are movable in response to movements of said wheels, four other means one each of which is connected to a said assembly of four said cylinders and to said frame which cylinders are movable in response to movements of said frame, a hydraulic stabilizing cylinder and a piston movable therein, for each said wheel, the first-mentioned four means being connected to four said stabilizing cylinders, and four other means one each of which is connected to said frame and to a said stabilizing cylinder, a hydraulic system of pressure lines and return lines in communication with said four stabilizing cylinders and with said four assemblies of control valve hydraulic cylinders, and pressure generating means supported by said frame in communication with said hydraulic pressure and return lines, said control valve pistons and cylinders normally keeping both said lines closed, said stabilizing pistons and cylinders and said control valve pistons and cylinders being movable relative to each other in response to movements of said wheels or frame of said vehicle to thereby change the positions of said stabilizing cylinders and pistons therefor with relation to each other and the positions of said control valve cylinders and pistons with relation to each other to thereby cause movement thereof from closed to open position or from open to closed position.

3. A vehicle in combination with a vehicular stabilizing system, said vehicle embodying a pair of wheels at the front and a pair of wheels at the rear, a frame supported by said wheels, four assemblies each of four control valve hydraulic cylinders and four control valve pistons movable therein, four means one each of which is connected to a said wheel and to the said pistons of a said assembly which pistons are movable in response to movements of said wheels, four other means one each of which is connected to a said assembly of four said cylinders and to said frame which cylinders are movable in response to movements of said frame, a hydraulic stabilizing cylinder and a piston movable therein, for each said wheel, the first-mentioned four means being connected to four said stabilizing cylinders, and four other means one each of which is connected to said frame and to a said stabilizing cylinder, a hydraulic system of pressure lines and return lines in direct communication with a pair of said stabilizing cylinders for a said front wheel and a rear wheel, and with a pair of said assemblies of control valve hydraulic cylinders for the latter said front wheel and rear wheel, another hydraulic system of pressure lines and return lines in direct communication with another pair of said stabilizing cylinders for another said front wheel and a rear wheel and with another pair of said assemblies of control valve hydraulic cylinders for the latter said front wheel and rear wheel, and pressure generating means supported by said frame in communication with said hydraulic pressure and return lines, said control valve pistons and cylinders normally keeping both said lines closed, said stabilizing pistons and cylinders and said control valve pistons and cylinders being movable relative to each other in response to movements of said wheels or frame of said vehicle to thereby change the positions of said stabilizing cylinders and pistons therefor with relation to each other and the positions of said control valve cylinders and pistons with relation to each other to thereby cause movement thereof from closed to open position or from open to closed position.

4. A vehicle in combination with a vehicular stabilizing system, said vehicle embodying wheels at the front and rear, a frame supported by said wheels, two assemblies each of four control valve hydraulic cylinders and four control valve pistons movable therein, two means one each of which is connected to a said wheel and to the said pistons of a said assembly which pistons are movable in response to movements of said wheels, two other means one each of which is connected to a said assembly of four said cylinders and to said frame which cylinders are movable in response to movements of said frame, a hydraulic stabilizing cylinder and a piston movable therein, for each said wheel, the first-mentioned two means being connected to two said stabilizing cylinders, and two other means one each of which is connected to said frame and to a said stabilizing cylinder, a hydraulic system of pressure lines and return lines in communication with said two stabilizing cylinders and with said two assemblies of control valve hydraulic cylinders, and pressure generating means supported by said frame in communication with said hydraulic pressure and return lines, said control valve pistons and cylinders normally keeping both said lines closed, said stabilizing pistons and cylinders and said control valve pistons and cylinders being movable relative to each other in response to movements of said wheels or frame of said vehicle thereby change the position of said stabilizing cylinders and pistons therefor with relation to each other and the positions of said control valve cylinders and pistonst with relation to each other to thereby cause movement thereof from closed to open position or from open to closed position.

5. A hydraulic stabilizing system in combination with a vehicle, having front and rear wheels and a frame supported by said wheels, hydraulic pressure generating means supported by said frame, said system having a first assembly of four control valve cylinders and pistons movable therein for a front wheel, each said cylinder having an upper chamber and a lower chamber, a stabilizing cylinder and piston movable therein for said front wheel, said latter cylinder having an upper chamber and a lower chamber, all of said chambers having an inlet and an outlet, a second said assembly for a rear wheel and a said stabilizing cylinder and piston for said rear wheel, a first pressure conduit communicating with said generating means and with said fornt wheel upper and lower control valve chambers, a second pressure conduit communicating with said latter control valve chambers and with a first said rear wheel control valve upper chamber and with a said rear wheel stabilizing cylinder lower chamber, a third pressure conduit communicating with said second conduit and with said first control valve rear wheel lower chamber and with a said rear wheel stabilizing cylinder upper chamber, a first return conduit communicating with a said rear wheel stabilizing cylinder upper chamber and with a second said rear wheel control valve upper chamber of a second said cylinder, a second return conduit communicating with said rear wheel stabilizing cylinder lower chamber and with a second said rear wheel control valve lower chamber, a third return conduit communicating with said latter control valve upper and lower chambers and with said upper and lower control valve chambers of a second said front wheel control valve cylinder, a fourth return conduit communicating with said latter chambers and with said generating means, a fourth pressure conduit communicating with said generating means and with said rear wheel upper and lower control valve chambers of a third said cylinder, a fifth pressure conduit communicating with said latter control valve chambers and with a said front wheel control valve upper chamber of a third said control valve cylinder and with a said front wheel stabilizing cylinder lower chamber, a sixth pressure conduit communicating with said fifth said conduit and with said front wheel control valve lower chamber of said third control valve cylinder and with said front wheel stabilizing cylinder upper chamber, a fifth return conduit communicating with said front wheel stabilizing cylinder upper chamber and with a said front wheel control valve upper chamber of a fourth said control valve cylinder, a sixth return conduit communicating with said front wheel stabilizing cylinder lower chamber and with said front wheel control valve lower chamber of said fourth cylinder, a seventh return conduit communicating with said latter control valve upper and lower chambers and with said upper and lower chambers of a said rear wheel fourth control valve cylinder, and an eighth return conduit communicating with said latter upper and lower chambers and with said generating means.

6. A hydraulic stabilizing system in combination with a vehicle having two front and two rear wheels and a frame supported by said wheels, hydraulic pressure generating means supported by said frame, said system having a first assembly of four control valve cylinders and pistons movable therein for a front wheel, each said cylinder having an upper chamber and a lower chamber, a stabilizing cylinder and piston movable therein for said front wheel, said latter cylinder having an upper chamber and a lower chamber, all of said chambers having an inlet and an outlet, a second said assembly for a rear wheel and a said stabilizing cylinder and piston for said rear wheel, pressure conduit means embodying a first pressure conduit communicating with said generating means and with said front wheel upper and lower control valve chambers, a second pressure conduit communicating with said latter control valve chambers and with a first said rear wheel control valve upper chamber and with a said rear wheel stabilizing cylinder lower chamber, a third pressure conduit communicating with said second conduit and with said first control valve rear wheel lower chamber and with a said rear wheel stabilizing cylinder upper chamber, return conduit means embodying a first return conduit communicating with a said rear wheel stabilizing cylinder upper chamber and with a second said rear wheel control valve upper chamber of a second said cylinder, a second return conduit communicating with said rear wheel stabilizing cylinder lower chamber and with a second said rear wheel control valve lower chamber, a third return conduit communicating with said latter control valve upper and lower chambers and with said upper and lower control valve chambers of a second said front wheel control valve cylinder, a fourth return conduit communicating with said latter chambers and with said generating means, a fourth pressure conduit communicating with said generating means and with said rear wheel upper and lower conduit valve chambers of a third said cylinder, a fifth pressure conduit communicating with said latter control valve chambers and with a said front wheel control valve upper chamber of a third said control valve cylinder and with a said front wheel stabilizing cylinder lower chamber, a sixth pressure conduit communicating with said fifth said conduit and with said front wheel control valve lower chamber of said third control valve cylinder and with said front wheel stabilizing cylinder upper chamber, a fifth return conduit communicating with said front wheel stabilizing cylinder upper chamber and with a said front wheel control valve upper chamber of a fourth said control valve cylinder, a sixth return conduit communicating with said front wheel stabilizing cylinder lower chamber and with said front wheel control valve lower chamber of said fourth cylinder, a seventh return conduit communicating with said latter control valve upper and lower chambers and with said upper and lower chambers of a said rear wheel fourth control valve cylinder, and an eighth return conduit communicating with said latter upper and lower chambers and with said generating means, said system having a third said assembly for another front wheel and a fourth said assembly for another rear wheel, a said stabilizing cylinder and piston movable therein for each said other front wheel and said rear wheel, and a said pressure conduit means and a said return conduit means communicating with said third and fourth assemblies and with said two other stabilizing cylinders as aforesaid.

References Cited in the file of this patent

UNITED STATES PATENTS

| | | |
|---|---|---|
| 2,490,719 | Tank | Dec. 6, 1949 |
| 2,788,985 | Girton | Apr. 16, 1957 |